United States Patent [19]

Ivins

[11] Patent Number: 4,714,088
[45] Date of Patent: Dec. 22, 1987

[54] WATER SAVING FLOAT FOR A WATER TANK

[76] Inventor: James M. Ivins, Box 10-20, St. Michaels, Md. 21663

[21] Appl. No.: 55,357

[22] Filed: May 29, 1987

[51] Int. Cl.⁴ .................. F16K 31/18; F16K 31/28; F16K 33/00
[52] U.S. Cl. .................. 137/426; 137/423; 137/429; 137/434
[58] Field of Search .......... 4/330, 331, 391, 395; 137/423, 426, 429, 434

[56] References Cited

U.S. PATENT DOCUMENTS

| 1,547,255 | 7/1925 | Mueller | 4/395 |
| 1,788,827 | 1/1931 | Ferrin | 137/426 |
| 1,919,700 | 7/1933 | Lundberg | 4/330 |
| 1,972,331 | 9/1934 | Dean | 137/426 |
| 2,847,026 | 8/1958 | Nelson | 137/434 |
| 3,331,387 | 7/1967 | Walters | 137/426 |
| 3,385,317 | 5/1968 | Yankers | 137/426 |
| 4,335,741 | 6/1982 | Nasser | 137/426 |
| 4,640,307 | 2/1987 | Roberts | 137/426 |

FOREIGN PATENT DOCUMENTS

| 23565 | 5/1936 | Australia | 137/426 |
| 377535 | 9/1907 | France | 137/423 |
| 260667 | 10/1928 | Italy | 137/426 |
| 199058 | 6/1923 | United Kingdom | 137/426 |
| 467429 | 6/1937 | United Kingdom | 137/426 |
| 861706 | 2/1961 | United Kingdom | 137/423 |

Primary Examiner—George L. Walton
Attorney, Agent, or Firm—Melvin L. Crane

[57] ABSTRACT

A water saving float for a water tank which includes a connector that connects the float to the cut-off rod. The float is adjustable for different settings so that the water height in the tank may be controlled. The adjusting device is out of the water so the hands do not get wet during adjustment.

15 Claims, 2 Drawing Figures

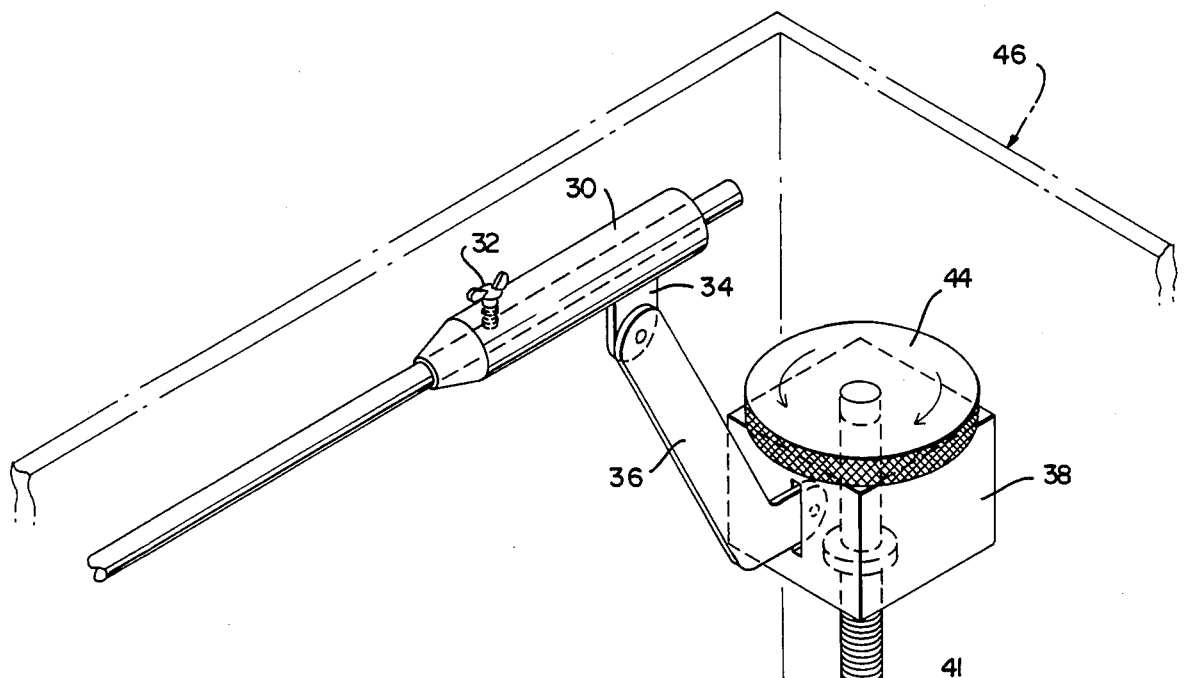
FIG. 2
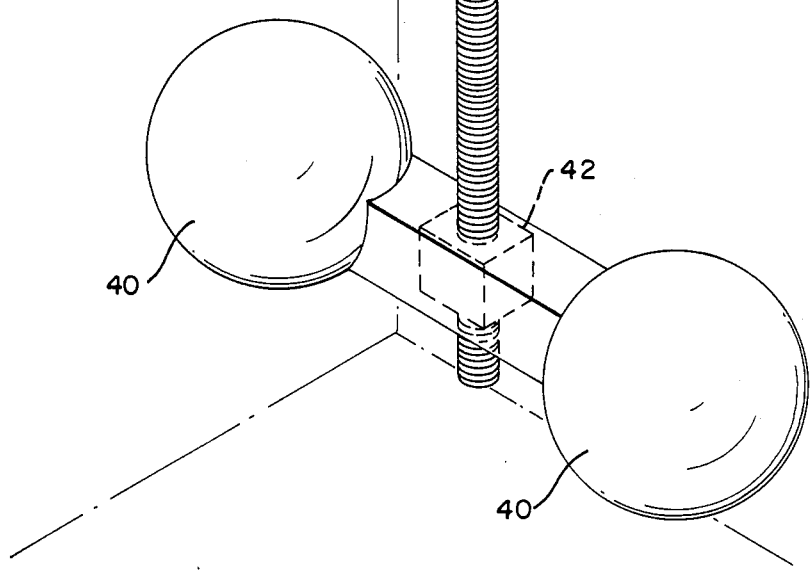

WATER SAVING FLOAT FOR A WATER TANK

This invention is directed to a float for a water tank and more particularly to a float which will permit the correct amount of water to enter a tank for each flush.

Heretofore, various devices have been used to try to save water in a flush tank. Such devices used have been containers which are filled with water and placed in the tank so that the filled container displaces the same amount of water which is not flushed. People have placed non-floating bricks, rocks, cement blocks or any such solid devices which will displace the water. Other flush tanks have been provided with various mechanical devices which cooperate with the fill valve to turn the water off after a certain amount has entered the tank. Such devices may be found in the following prior art U.S. Pat. Nos. 1,547,255; 1,919,700; 2,847,026; and 3,385,317. These devices are fixed in place or are not easily adjusted for different amounts of water; therefore, too much water may still enter the tank and be wasted.

It is therefore an object of the invention to provide a water saving device which can be adjusted for precise amounts of water which will be sufficient for flushing.

Another object is to provide an adjustable float mechanism that can be assembled by an inexperienced person and not require a plumber for the installation.

Yet another object is to provide an adjustable float which may be made of an inexpensive material such that the cost will be at a minimum.

Still another object is to provide a float mechanism which may be easily adjusted for setting the amount of water that will enter the tank.

These and other objects and advantages will become obvious with reference to the drawings.

BRIEF DESCRIPTION OF THE DRAWINGS

FIG. 2 illustrates a modification having two floats.

DETAILED DESCRIPTION

Figure 1:
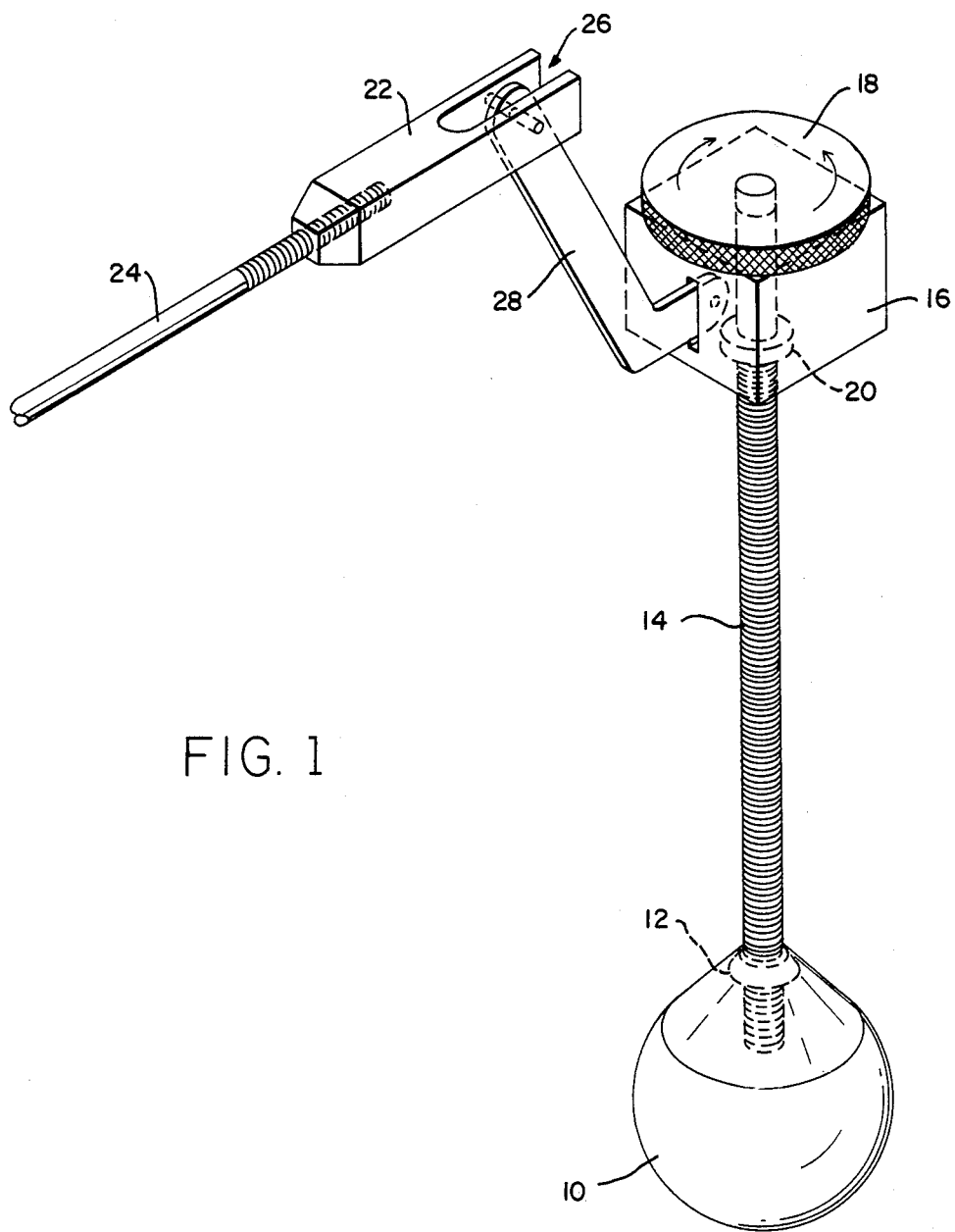
FIG. 1 illustrates a water saving device having a single float.

Now referring to the drawing there is shown in FIG. 1 a float 10 which is provided with a screw thread end 12 into which a threaded rod 14 is threaded. The upper end of the threaded rod is smoother and passes through a link holder block 16. A wheel 18 is secured to the upper end of the non-threaded end of the rod close to the upper face of the block 16. The rod may have a collar 20 secured thereto just below the block or the rod may be of a larger size below the block such that a shoulder rides along the bottom face of the block. Obviously, a washer could be placed between the shoulder and the bottom face of the block to replace the collar and to prevent wear on the block. A threaded float rod connecting adapter 22 is provided to be threaded onto the normal float rod 24 connected to the control valve of the tank, not shown. The connecting adapter 22 has a bifurcated end 26 to which one end of a link 28 is connected by a suitable pin. The other end of the link connects with the link holder block 16 and is pivotable about a securing pin. The link is shaped such that the bottom heel contacts the bottom of the opening in the link holder blocks so that the link end connected to the block is restricted in the height to which it can be raised. The wheel may be threaded onto a threaded end, press filled thereon, or secured thereto by any suitable means.

In operation, the link 28 connects the float assembly to the float rod 24 by the connector adaptor 22. The wheel may be rotated to the right or left to raise or lower the float depending on the thread cut on the rod. Obviously, when the float is raised more water will enter the tank because the cut-off valve will be operated later. Lowering the float will cause less water to enter the tank.

Some control valves are provided with float rods that are not threaded. In this case the connecting adaptor may be made as a sleeve 30 which fits over the rod and which may be held in place by use of a wing screw 32 such as shown in FIG. 2. The sleeve shown in FIG. 2 has a protruding bifurcated connector 34 extending from the bottom to which one end of a link 36 is connected to link connecting block 38. The link connecting block 38 may be substantially the same as that of block 16 with the pivot connection and the end of the link formed such that the link can pivot only so far to restrict the height of the connecting end. In FIG. 2, there are shown two oppositely disposed floats 40, 42, one on each side of the rod with a threaded connector 42 that secures the floats together. The rod may extend through the block 38 the same as shown in FIG. 1 and has a wheel 44 connected to the upper end for rotating the rod into or out of the float connector 42. Since there are two floats as the rod is rotated, one of the floats will be forced against the end or side of the tank and will be held in place during rotation of the rod by the wheel. In order to move the float from contacting the tank the wheel may be rotated slightly in the opposite direction until the floats parallel the tank wall in which it was in contact. The device as shown in FIG. 2 may be adjusted without getting the hands wet because the wheel will be above the water.

The link may be made with a stop thereon which will limit the upward movement relative to the connecting adaptor or either the connecting adaptor may be provided with a downwardly extending stop which would limit the upward swing of the link.

The relationship between the float rod, the float assembly, and the end of the tank must be such that the float assembly will have room to move with respect to the float rod and the link.

In the device as shown in FIG. 1, the block could be threaded as shown in FIG. 2 and the rod could be threaded through the block. Then the collar would be dispensed with. In this manner the float is adjusted first on the rod to a certain height, then the wheel is rotated for a finer adjustment and without getting the hands wet. In such a device, the wheel will be removed a distance from the block in order to provide room for adjustment. In such a device, instead of the collar, a lock nut could be used which would secure the rod in place once the adjustment has been made.

The block, as shown in FIG. 2, is threaded. Thus, the rod can be adjusted in the block simultaneously with the adjustment in the float. In the device of FIG. 1 with a threaded block, only the rod will be adjusted in the block unless the float is held in place during the adjustment. In FIG. 1, one would have an option of adjustment of the float, by the wheel or by both the float and the wheel. The float is held in place while rotating the wheel.

It is to be understood that the invention is not restricted to the precise construction shown and that various changes may be made within the scope of the teaching of the invention.

What is claimed and desired to be protected is as follows:

1. A water saving float assembly for selecting various water levels in a water closet which comprises: a float means, a threaded rod upon which said float means is adjustably secured for determining the various water levels, a link connecting block through which a portion of said rod extends for adjusting the height of said float, an adjusting wheel secured to said rod above said link connecting block and the water levels for controlling the adjustable height of said rod, a connecting link secured at one end to said link connecting block, a connecting adaptor for connecting another end of said connecting link, said adaptor being adjustably connected to a valve control rod of a water control valve whereby the amount or water allowed to flow into said water closet will be controlled by the adjustment of said float means as a result of the above adjustable elements.

2. A water saving float assembly as set forth in claim 1 which includes means for restricting the length of said rod portion that extends through said link connecting block, and said rod portion is without threads thereon.

3. A water saving float assembly as set forth in claim 2 which includes at least one float.

4. A water saving float assembly as set forth in claim 2 which includes two oppositely disposed floats.

5. A water saving float assembly as set forth in claim 1 in which said rod portion that extends through said link connecting block is threaded.

6. A water saving float assembly as set forth in claim 5 which includes at least one float.

7. A water saving float assembly as set forth in claim 5 which includes two oppositely disposed floats.

8. A water saving float assembly as set forth in claim 1 in which said connecting adaptor is threaded onto said float rod.

9. A water saving float assembly as set forth in claim 8 which includes at least one float.

10. A water saving float assembly as set forth in claim 8 which includes two oppositely disposed floats.

11. A water saving float assembly as set forth in claim 1 in which said connecting adaptor is a sleeve that slides onto said float rod and is held in place by a set screw.

12. A water saving float assembly as set forth in claim 11 which includes at least one float.

13. A water saving float assembly as set forth in claim 11 which includes two oppositely disposed floats.

14. A water saving float assembly as set forth in claim 1 which includes at least one float.

15. A water saving float assembly as set forth in claim 1 which includes two oppositely disposed floats.

* * * * *